United States Patent [19]

Ekman

[11] Patent Number: 4,731,882

[45] Date of Patent: Mar. 22, 1988

[54] SAFETY GARMENT

[75] Inventor: Tommy Ekman, Krylbo, Sweden

[73] Assignee: Irvin Fallskarms AB, Avesta, Sweden

[21] Appl. No.: 890,149

[22] PCT Filed: Dec. 6, 1985

[86] PCT No.: PCT/SE85/00507

§ 371 Date: Jul. 28, 1986

§ 102(e) Date: Jul. 28, 1986

[87] PCT Pub. No.: WO86/03382

PCT Pub. Date: Jun. 19, 1986

[30] Foreign Application Priority Data

Dec. 6, 1984 [SE] Sweden ................................ 8406210

[51] Int. Cl.[4] ....................... A41D 13/00; B64D 17/00

[52] U.S. Cl. ................................................ 2/69; 2/79; 2/94; 244/143

[58] Field of Search ...................... 2/69, 44, 45, 79, 94, 2/69.5; 244/143

[56] References Cited

U.S. PATENT DOCUMENTS

| | | | |
|---|---|---|---|
| 1,845,099 | 2/1932 | Popelakova | 244/143 |
| 1,849,628 | 3/1932 | Lemercier | 244/143 |
| 2,342,420 | 2/1944 | Miner | 244/143 |
| 2,431,811 | 12/1947 | Lang | 2/79 X |
| 2,887,286 | 5/1959 | Moran | 244/143 |
| 4,065,814 | 1/1978 | Fox | 2/79 |
| 4,302,847 | 12/1981 | Miles | 2/94 X |

*Primary Examiner*—Werner H. Schroeder
*Assistant Examiner*—J. L. Olds
*Attorney, Agent, or Firm*—Christel, Bean & Linihan

[57] ABSTRACT

A garment that is connectable to a safety line or the like and which includes at least one band, which is intended to take up the weight of a person wearing the garment. The band is disposed to move substantially freely in channels (a–c) in the garment (1), the channels being oriented such that a tensional force in the band, applied at the connection point (21) between it and the safety line, achieves tightening of the band and thereby the garment round the person.

14 Claims, 12 Drawing Figures

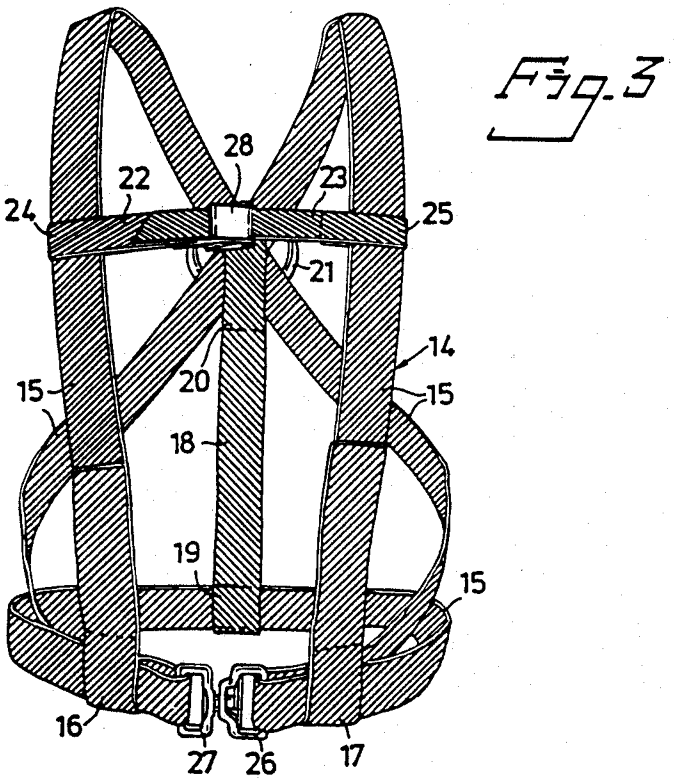
Fig. 3
Fig. 4
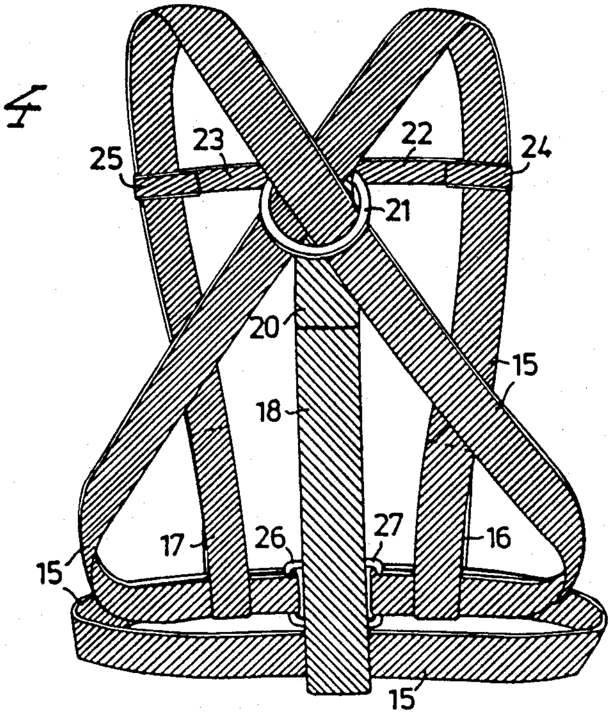

SAFETY GARMENT

TECHNICAL FIELD

The present invention relates to a garment that is connectable to a safety line or the like and which includes at least one band of material intended to take up the weight of a person wearing the garment.

BACKGROUND ART

Belts, harnesses and the like, intended to be worn by persons who risk falling from heights, and which are connectable to a line, the other end of which is attached to a fixed point, are known in the art. Garments with sewn-on belts and/or harnesses of the kind described are also known.

The greatest disadvantage burdening these belts, harnesses and garments is that when a person wearing one of them falls, only the part of this person's body facing the falling direction will take up the load via the belt harness or garment, resulting in that the load will not be satisfactorily distributed over the body, with possible injuries as a result.

Another disadvantage affecting the belts, harnesses and garments is that they must fit tightly round the body, in order to have the intended effect in case of a fall, which restricts freedom of movement for the wearer.

A still further disadvantage suffered by garments with belts or the like, is that the garment and/or belt must be spoilt or at least receive some damage when the garment is to be separated from the belt, e.g. in connection with strength checks and/or exchange of parts.

DISCLOSURE OF INVENTION

The object of the present invention is to improve garments of the kind mentioned in the introduction, and to provide a garment that distributes the load over the wearer's body in the case of a fall, allows exchange of parts of the garment without damaging garment or parts, and that is comfortable to wear.

This object is attained by the invention having been given the distinguishing features disclosed in the characterising portions of the accompanying claims.

DESCRIPTION OF FIGURES

FIG. 3 is a front view of a harness comprising bands of material, for insertion in the waistcoat of FIGS. 1 and 2.

FIG. 4 is a rear view of the harness in FIG. 3.

PREFERRED EMBODIMENTS

Figure 1:
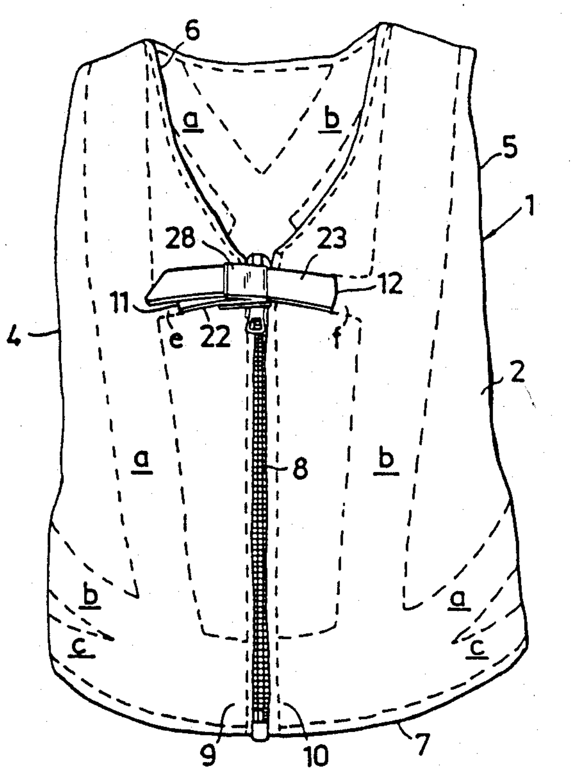
FIG. 1 is a front view of a first embodiment of the invention in the form of a waistcoat.
Figure 2:
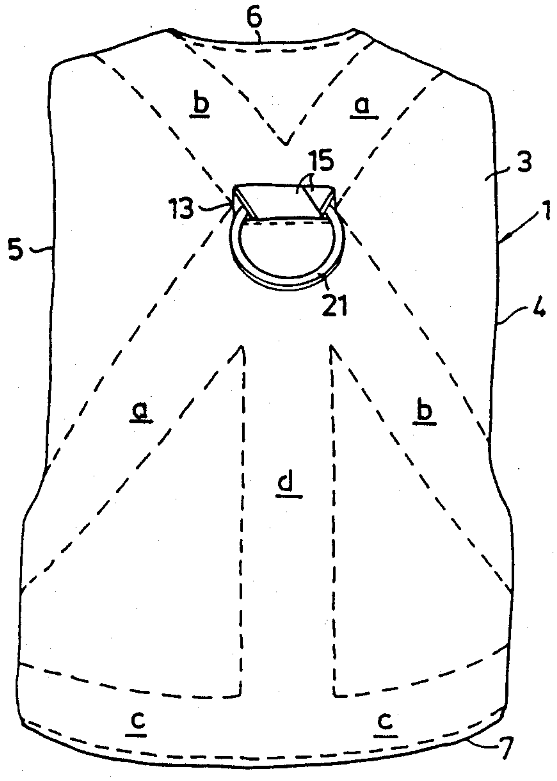
FIG. 2 is a rear view of the waistcoat in FIG. 1.

The waistcoat 1 illustrated in FIGS. 1 and 2 comprises its back 2 and front 3, joined to each other, with customary openings 4, 5, 6 and 7 respectively for arms, neck and waist, there also being a zip fastener 8 parting the front into two halves. The material in the waistcoat is suitably synthetic and inelastic, with great tensional and tear strength. The back and front each comprises two layers of material, mutually connected by unillustrated seams at 4, 5, 6, 7 and 8 and by seams indicated by dashed lines, which define channels only accessible via four openings 9–12 on the front 2 and an opening 13 on the back 3.

The channels are in mutual communication and may be said to consist of: (a) a channel a extending from the left lower portion in FIG. 1 of the front 2, up over the left shoulder portion and then slopingly downwards across the back 3 and onwards to the right lower portion in FIG. 1 of the front, (b) a channel b extending from the right, lower portion of the front, up over the right shoulder portion and then slopingly downwards across the back and onwards to the left, lower portion of the front, (c) a channel c extending round the waistcoat immediately above its bottom edge, (d) a channel d extending between channel c and the intersection of channels a and b on the back, and (e) smaller channels e and f extending respectively between channel a and the opening 11 and between channel b and opening 12.

The harness, denoted 14 and illustrated in FIGS. 3 and 4, is intended to be inserted in channels a–f of the waistcoat via the openings 9–13 thereto, which is possible without any damage or interference to, or with, the waistcoat 1. The harness 14 includes a band 15, which assumes the shape illustrated in FIGS. 3 and 4 after insertion in channels a–c. The band 15 is inserted in the channels a–c by one end of the band, which is folded round and sewn to itself to form a loop 16, being inserted through the opening 9, pushed through the channel c round the waistcoat 1 and out through the opening 10, a first connection ring 26 then being placed on the band. The end (loop) 16 is then taken back through the opening 10, into the channel a (which extends right across the back 3, over the left shoulder portion in FIG. 1 of the waistcoat and downwards on the front 2 towards the opening 9) until the end 16 projects out from the opening 9. A second connection ring 27 is now placed on the band 15 from its other end at 17, the band being folded over where it thrusts out from the opening 9. The ring 27 with the folded-over part of the band is then inserted into the loop 16 from the left in FIGS. 1 and 3, the end 17 then being inserted into channel b (which extends right across the back 3, over the right shoulder portion in FIG. 1 of the waistcoat and downwards on the front 2 towards the opening 10). The ring 26 with the folded-over part of the band 15 is then inserted into the loop 17 from the right in FIGS. 1 and 3.

Before the band 15 is inserted in the channels a–c there are inserted: (a) a band 18 in channel d, this band having a lower end that is folded over and sewn into a loop 19, which projects into the channel c in the middle of the back 3, and an upper end that is folded over and sewn into a loop 20, in which a metal D-shaped ring is inserted, this ring partially projecting into channels a and b where these channels cross each other on the back during the insertion of band 15 therein, (b) two bands 22 and 23 respectively in the channels e and f, so that loops 24 and 25 on the bands thrust into channels a and b on the front. Thus, when the band 15 is inserted in channels a–c it will be taken through the loop 19 of band 18, through the D ring 21 fastened to band 18 and through the loops 24 and 25 on respective bands 22 and 23.

No parts of the bands 15, 18, 22 and 23 are fastened to the waistcoat, and they can move freely in the longitudinal directions of channels a–f. Let it now be assumed that a person puts on the waistcoat, with the harness inserted, with the bands 22 and 23 removably connected to each other by a locking device 28, with the connection rings 26 and 27 removably connected to each other by a bayonet coupling formed by the rings, and that this person is connected, via the portion of the D ring 21 projecting out from the opening 13, to an unillustrated safety line or the like coupled to a fixed object. If this person should fall from a height, the band 15 will tighten round the person, since the band slides in the channels a–c and in the rings 21, 26 and 27, which also causes the waistcoat to be pulled tight round the person. The part of the band 15 that is taken up during this process will project out of the opening 13 to an extend depending on the size of the waistcoat and harness in relation to the particular person.

Figure 5:
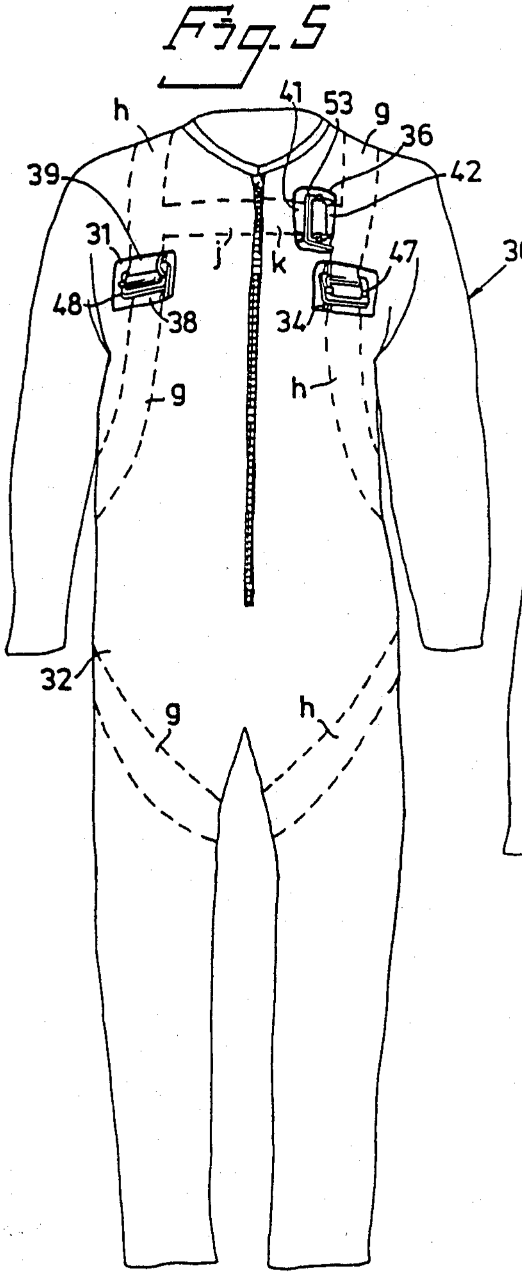
FIG. 5 is a front view of a second embodiment of the invention in the form of an overall.
Figure 6:
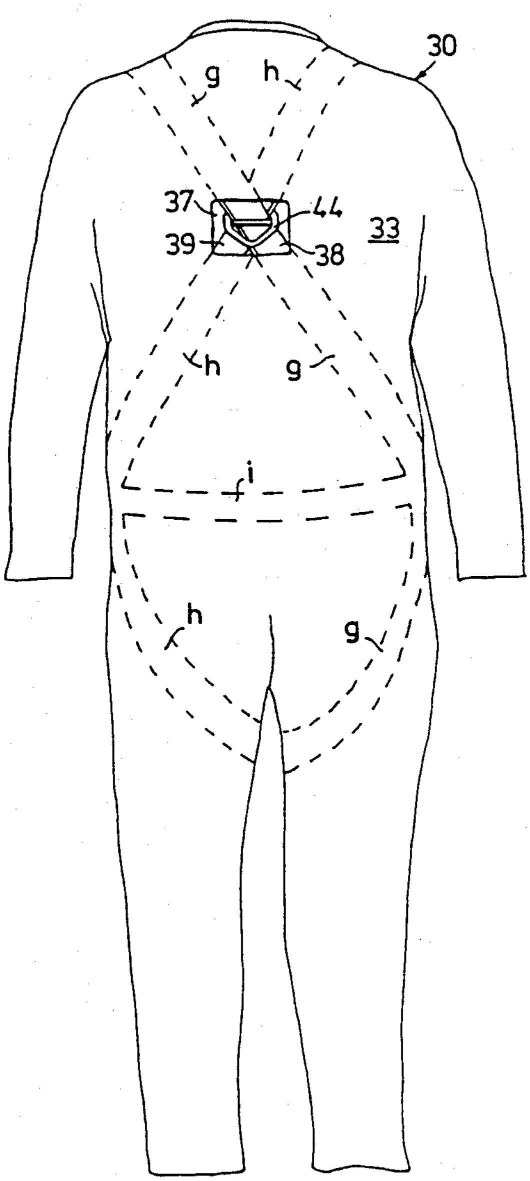
FIG. 6 is a rear view of the overall in FIG. 5.

The overall 30 illustrated in FIGS. 5 and 6 is of a conventional kind and consists of the same material as the waistcoat 1. It has double material layers, at least in the areas where there are mutually communicating channels defined by seams, where it may be said that these channels include: (a) a channel g, extending downwards from an opening 31 therein on the front 32 of the overall, obliquely backwards-downwards across the back of the left leg in FIG. 5 of the overall, round the leg, slopingly upwards across the back to the right shoulder portion in FIG. 5 and then downwards to a second opening 34 on the front, (b) a channel h extending downwards from the opening 34, obliquely backwards-downwards across the back of the right overall leg in FIG. 5, round this leg, slopingly upwards across the back to the left shoulder portion in FIG. 5 and then downwards to the opening 31, (c) a third channel i in the back 33 at waist height, and (d) channels j and k in the upper part of the front 32.

Figure 7:
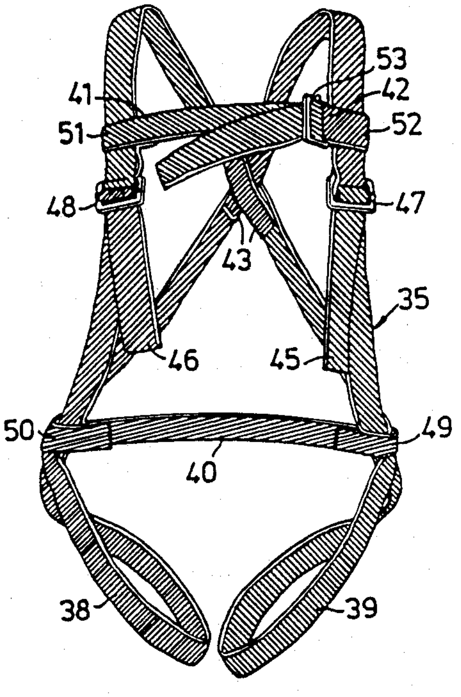
FIG. 7 is front view of a harness comprising bands of material, for insertion in the overall of FIG. 6.
Figure 8:
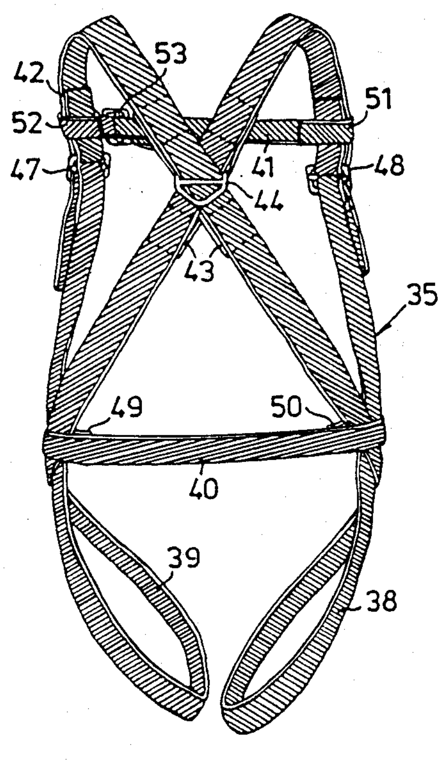
FIG. 8 is a rear view of the harness in FIG. 7.

The harness, denoted 35 illustrated in FIGS. 7 and 8, is intended for insertion in the channels g–k of the overall 30 via openings 31 and 34, an opening 36 in the upper portion of the front and an opening 37 in the middle portion of the back. The harness may be inserted into or withdrawn from the channels without needing to cut the overall or subject it to any other damage.

The harness is illustrated in FIGS. 7 and 8 in approximately the shape it has when it has been inserted in the overall 30, and it comprises five bands, of which the first, denoted 38, is intended to be inserted in channel g, a second 39 in channel h, a third 40 in channel i, a fourth 41 in channel j and a fifth 42 in channel k.

Bands 38 and 39, which are joined to each other and to a D ring 44 by smaller band pieces sewn on to the bands at 43, are inserted in respective channels g and h, via the opening 37 in the back 33, by their free ends 45 and 46 being pushed through channels g and h across parts of the back and up over the shoulder portions until they come out at the openings 31 and 34, and by their other ends, provided with respective connection rings 47 and 48, being pushed through the remaining portions of channels g and h until these rings come out at the openings 31 and 34, the band ends 45, 46 being then removably connected to the rings 47, 48 after adjusting the band lengths.

Before the bands 38 and 39 are inserted in channels g and h, the band 40, provided with loops 49 and 50 at its ends is inserted in channel i, and the bands 41 and 42, which are provided with loops 51 and 52 are inserted in channels j and k, so that the bands 38 and 39 are inserted in these loops 49–52 when the bands are pushed through channels g and h.

The end of the band 42 is provided with a connection ring 53, accessible through the opening 36, for adjustable and removable connection to the band 41.

From FIGS. 5–8 and their pertaining description, as well as the reference to FIGS. 1–4 with pertaining description of the waistcoat 1, it will be understood how the overall 30 and harness 35 therein behave for a load applied to the D ring 44. In contrast to what is the case with the waistcoat 1, the bands 38 and 39 will not be urged against the back of the person wearing the overall on being loaded, instead there will be a certain tightening of these bands round the thighs of the person.

Figure 9:
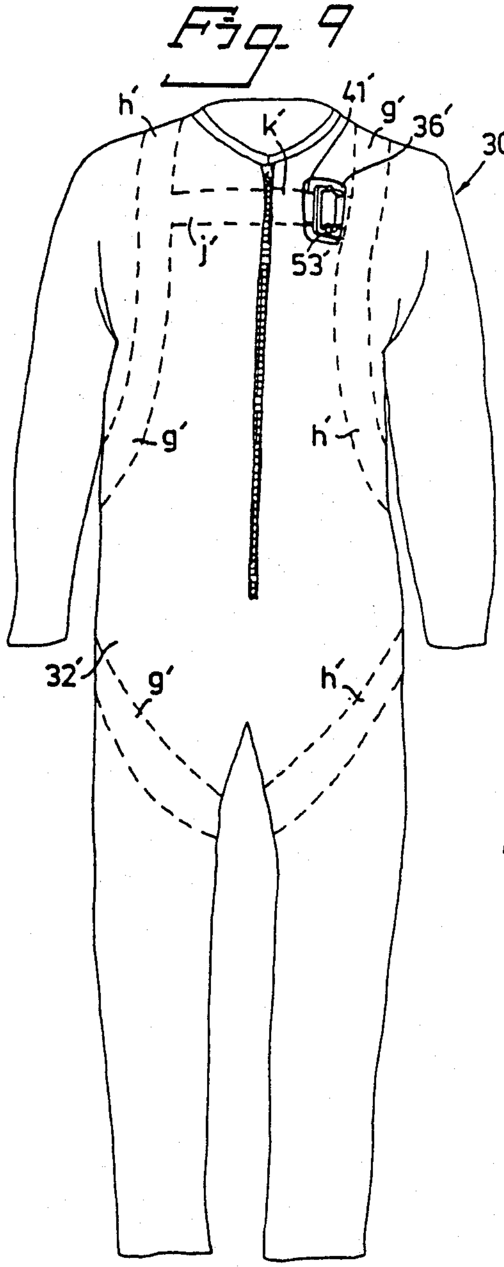
FIG. 9 is a front view of a third embodiment of the invention in the form of an overall.
Figure 10:
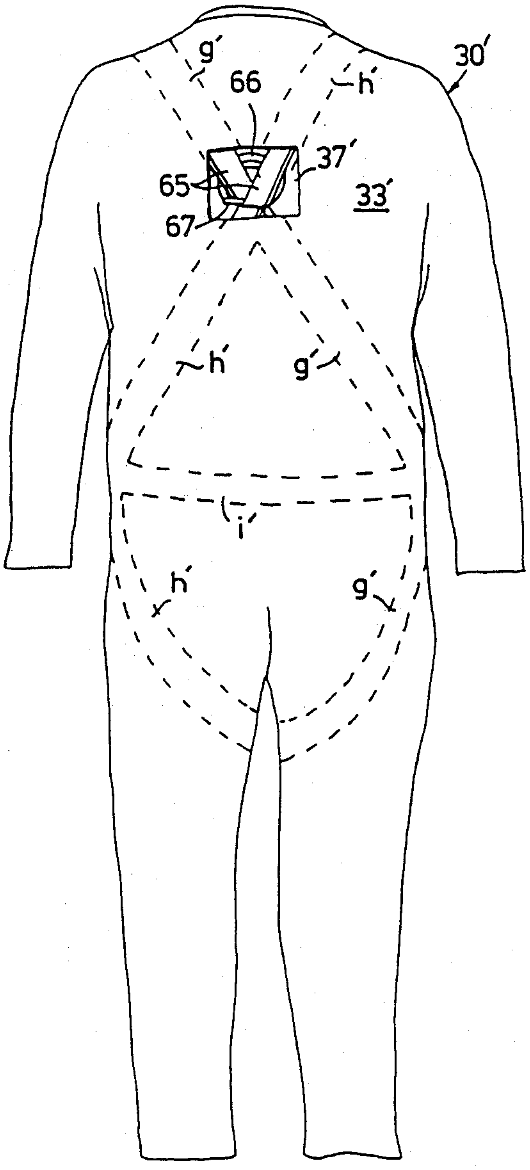
FIG. 10 is a rear view of the overall in FIG. 9.

An overall according to a third embodiment of the invention is illustrated in FIGS. 9 and 10, this overall being identical with the one illustrated in FIGS. 5 and 6, excepting that the former has no openings 34, 38. The parts of the overall in FIGS. 9 and 10 corresponding to the same parts on the overall in FIGS. 5 and 6 have been given the same denotations, with the addition of a prim (′) sign.

Figure 11:
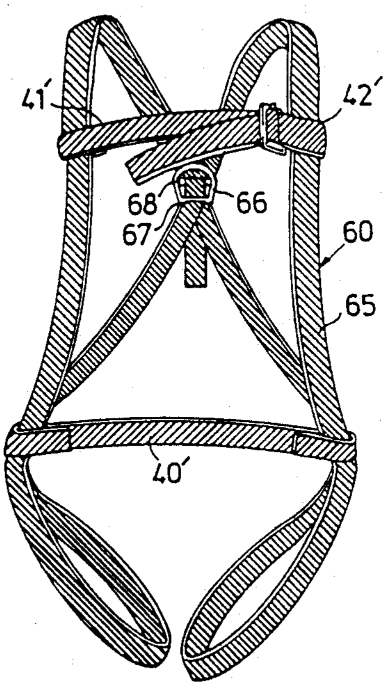
FIG. 11 is a front view of a harness comprising bands of material, for insertion in the overall of FIGS. 9 and 10.
Figure 12:
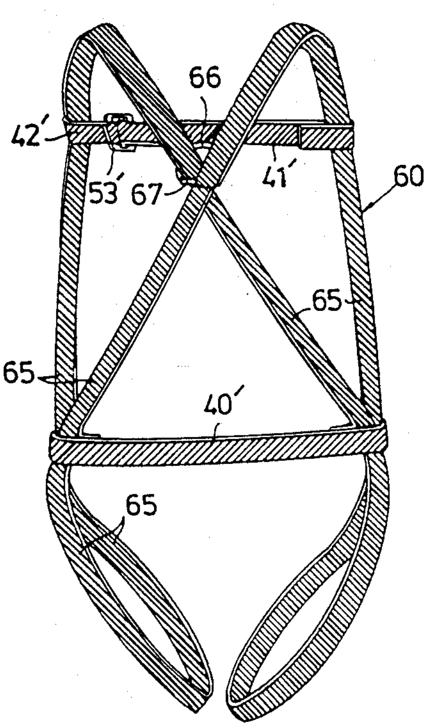
FIG. 12 is finally a rear view of the harness in FIG. 11.

A harness 60 is illustrated in FIGS. 11 and 12, in the shape it assumes when it has been inserted in the channels g′–k′ of the overall 30′. The harness comprises a first band 65, second, third and fourth bands 40′, 41′ and 42′ (identical with bands 40, 41 and 42), a D ring 66 and an unillustrated locking device. The band 40′ is intended to be inserted in channel i′, band 40′ in j′ and band 42′ in k′, while band 65 is intended to be inserted in channels g′ and h′ after bands 40′, 41′ and 42′.

One end of band 65 is inserted through the opening 37′, slopingly downward in channel h′, round the left leg of the overall in FIG. 10, up through channel h′ and its merging into channel g′ and over the left shoulder portion in FIG. 10 until the band comes out at the opening 37′, where it is taken round one 67 of the two parallel bars 67 and 68 on the ring 66, then slopingly upwards in channel h′, over the right shoulder portion in FIG. 10 and straight downwards in channel h′ and into the channel g′ with which it merges. From the last-mentioned part of channel g′ the end of band 65 is taken further through channel g′, round the right leg of the overall in FIG. 10 and then slopingly upwards in the same channel on the back 33 until the end comes out at the opening 37′, where this end and its opposite end are taken over the bar 68 and thereafter removably and adjustably connected to the mentioned locking device, such that when a tensional force is applied to the ring 66 the band ends are not displaced in relation to each other or to the ring.

After having already described how the waistcoat of FIGS. 1–4 and the overall of FIGS. 5–8 function when a tensional force is applied to the respective ring 21, 44, it should be clear how the overall 30′ functions with its inserted harness 60 described in connection with FIGS. 9–12. Accordingly, it is only mentioned here that when a tensional force is applied to the ring 66, the band 65 will move freely in the channels g′ and h′ to tighten the overall round the wearer.

Although a pair of embodiments of the invention have been illustrated on the drawings and described above, it should be understood that the invention is not restricted to these embodiments, but only by the disclosures in the claims.

What is claimed is:

1. Garment, connectable to a safety line or the like by a connection point, and including at least one band of material, which is intended to take up the weight of a person wearing the garment and which is intended to glide in guide means mounted on the garment, said guide means being oriented such that a tensional force in the band applied at the connection point between said point and the safety line achieves tightening of the band, and thus the garment, around the person, characterized in that the garment (1; 30;30') comprises a front and a back each comprising outer and inner layers of material which are sewn together by seams to form the garment itself, as well as elongate channels (a–c; g,h; g',h') defined by the layers and the seams and constituting said guide means, and in that an opening (13; 37,37') is made in the back in the outer layer, through which the connection point is accessible, said connection point being formed as a ring (21; 44; 66) surrounding portions of the band (15; 38,39; 65) which overlappingly cross one another at said connection point.

2. Garment as claimed in claim 1, characterized in that the band (15; 65) is made in one piece and disposed for moving the channels (a–c; g',h') on both front and back of the garment (1; 30').

3. Garment as claimed in claim 1 or 2, characterized in that the band (15; 38, 39;65) is removable from the garment channels (a–c; g, h; g' h') without damage to the band and channels.

4. Garment as claimed in claim 1, characterized in that two parts of the band (15; 38,39) are provided with mutually engaging locking devices (26,27; 47,48), preferably accessible from the front of the garment (1; 30) for the removable connection of the parts.

5. Garment as claimed in claim 1, comprising a waistcoat, characterized in that when the waistcoat (1) is worn by a standing person, the band (15) extends upwards along the left half of the front (2) of the waistcoat from the bottom edge thereof, over the left shoulder portion, diagonally downwards across the back (3) to the bottom edge at the right half of the front, where it is folded, onwards along the bottom edge of the back to the bottom edge of the left half of the front, where it is folded, onwards diagonally upwards across the back, over the right shoulder portion and downwards along the right half of the front to the bottom edge thereof, both end portions (16,17) of the band at the left and right halves of the front bottom edges being folded round said folded parts of the band and fastened to themselves.

6. Garment as claimed in claim 4 or 5, characterized in that said ring (21) surrounds the mutually crossing parts of the band (15) on the back (3) of the garment (1).

7. Garment as claimed in claim 5, characterized in that each locking device includes a ring (26, 27) inserted between the folded parts of the band (15) at the bottom edge of the respective front portion.

8. Garment as claimed in claim 5, characterized in that a second band (18) extends between the ring (21) and the part of the first band (15) which is applied to the bottom edge of the back.

9. Garment as claimed in claim 5, characterized in that there is a third band (22, 23; 41,42; 41',42') preferably comprising two parts, said third band joining two parts of the first band (15; 38,39; 65) to each other, said third band being inserted in a channel (e, f; j,k, j'k') preferably consisting of two parts in an upper part of the front.

10. Garment as claimed in claim 1, comprising an overall having right and left shoulder portions and right and left leg portions, characterized in that when the overall (30) is worn by a standing person, a first part (39) of the band extends from the right shoulder portion of the overall diagonally across the back (33) to the left leg portion of the overall, around this leg portion and then upwards substantially vertically along the left half of the front to the left shoulder portion of the overall, a second part (38) of the band extending from the left shoulder portion of the overall diagonally across the back to the right leg portion of the overall, around this leg portion and then upwards substantially vertically along the right half of the front up to the right shoulder portion of the overall, and in that both first and second parts of said band are connected to each other at the shoulder portions, preferably with locking devices (47,48) regulating the lengths of the parts.

11. Garment as claimed in claim 10, characterized by another band (41, 42), the length of which is adjustable and which joins together both parts of said first mentioned band at the shoulder portions.

12. Garment as claimed in claim 1, comprising an overall having a pair of shoulder portions and a pair of leg portions, characterized in that when the overall (30') is worn by a standing person, a band (65) extends from the back diagonally downwards to one leg portion of the overall, around it, upwards along the part of the front (32') on the same side as the one leg portion, over the adjacent shoulder portion, diagonally downwards to, and through, the connection point (66), diagonally upwards over the other shoulder portion, downwards along the other half of the front, around the other leg portion and then up to the connection point (66), both free ends of the band (65) being connected for adjustment to each other and with a ring (66) constituting the connection point.

13. Garment as claimed in claim 12, wherein said band (65) has two parts and characterized by another band (41',42'), the length of which is adjustable and which joins together the two parts of the first-mentioned band (65).

14. Garment as claimed in claims 10 or 12, characterized by another band (40; 40') extending horizontally approximately at waist height on the back (33, 33') and removably connecting mutually crossing parts of the first-mentioned band (38,39; 65).

* * * * *